United States Patent
Abraham et al.

(10) Patent No.: US 9,965,767 B2
(45) Date of Patent: May 8, 2018

(54) ATTRIBUTION OF DEMOGRAPHICS TO CENSUS DATA

(71) Applicant: comScore, Inc, Reston, VA (US)

(72) Inventors: Magid Abraham, Great Falls, VA (US); Cameron Meierhoefer, Washington, DC (US); Frank Pecjak, Fairfax, VA (US); Ramzi Nasr, Arlington, VA (US)

(73) Assignee: comScore, Inc., Reston, VA (US)

( * ) Notice: Subject to any disclaimer, the term of this patent is extended or adjusted under 35 U.S.C. 154(b) by 0 days. days.

(21) Appl. No.: 13/834,550

(22) Filed: Mar. 15, 2013

(65) Prior Publication Data

US 2013/0290070 A1    Oct. 31, 2013

Related U.S. Application Data

(60) Provisional application No. 61/636,394, filed on Apr. 20, 2012.

(51) Int. Cl.
*G06Q 30/02* (2012.01)

(52) U.S. Cl.
CPC .............................. *G06Q 30/0204* (2013.01)

(58) Field of Classification Search
CPC ..................................................... G06Q 30/02
USPC ............................................................ 705/7.33
See application file for complete search history.

(56) References Cited

U.S. PATENT DOCUMENTS

| | | | |
|---|---|---|---|
| 7,152,074 B2 | 12/2006 | Dettinger et al. | |
| 7,272,617 B1 | 9/2007 | Bayer et al. | |
| 7,302,447 B2 | 11/2007 | Dettinger et al. | |
| 7,886,003 B2 | 2/2011 | Hopmann et al. | |
| 8,335,820 B1 | 12/2012 | Krigovski et al. | |
| 8,898,290 B2 * | 11/2014 | Siemsgluess | 709/224 |
| 2004/0167763 A1 | 8/2004 | Leibman | |
| 2004/0186840 A1 | 9/2004 | Dettinger et al. | |
| 2006/0004594 A1 * | 1/2006 | Doliov | G06F 17/30867 705/1.1 |
| 2006/0074953 A1 | 4/2006 | Dettinger et al. | |
| 2008/0189408 A1 * | 8/2008 | Cancel | G06Q 30/02 709/224 |
| 2008/0215595 A1 | 9/2008 | Suda | |
| 2009/0076899 A1 | 3/2009 | Gbodimowo | |
| 2010/0076814 A1 | 3/2010 | Manning | |
| 2011/0231240 A1 | 9/2011 | Schoen et al. | |
| 2012/0042262 A1 * | 2/2012 | Priyadarshan et al. | 715/745 |
| 2012/0072469 A1 | 3/2012 | Perez et al. | |
| 2012/0158954 A1 | 6/2012 | Heffernan et al. | |

(Continued)

*Primary Examiner* — Kurtis Gills
(74) *Attorney, Agent, or Firm* — Baker & Hostetler LLP

(57) ABSTRACT

In general, systems, components, methods, and techniques for gathering, recording, and development of accurate user demographics attributed to accesses by client systems of webpage, web content, or other online resources is provided. For a given a subset of unique users having known demographics for a segment of traffic or general population, a demographic profile may be created for all users of the segment or population within a tolerable margin of error. Demographic data for unique machine identifications (IDs) may be assigned, aggregated, and derived from a single source, or multiple sources, such as panel data, beacon level surveys, cookie exchanges, and the overlay of profile cookies from other publishers.

30 Claims, 7 Drawing Sheets

(56) References Cited

U.S. PATENT DOCUMENTS

| | | | |
|---|---|---|---|
| 2012/0215621 A1* | 8/2012 | Heffernan | H04L 43/04 705/14.41 |
| 2013/0145022 A1 | 6/2013 | Srivastava et al. | |
| 2014/0129349 A1* | 5/2014 | Vaynblat et al. | 705/14.66 |

* cited by examiner

ATTRIBUTION OF DEMOGRAPHICS TO CENSUS DATA

CLAIM OF PRIORITY

This application claims the benefit under 35 USC § 119(e) to prior filed U.S. Provisional Patent Application Ser. No. 61/636,394, titled "ATTRIBUTION OF DEMOGRAPHICS TO CENSUS DATA" filed on Apr. 20, 2012, which is herein incorporated by reference in its entirety for all purposes.

BACKGROUND

In general, accesses by client systems to web pages, web content, or any other resources may be recorded. These records may be combined with demographic data or demographic profiles about the individuals using the client systems. A demographic profile created from user demographics may provide enough information about the typical member of a group to create a mental picture of a hypothetical population of users. Typically, when developing demographic profiles, researchers first try to determine what subgroups or segments exist in an overall population; and then researchers try to create a clear and complete picture of the characteristics of a typical member of each segment of the population. Once these profiles are constructed, the profiles can be used for many things, such as, for example, to develop a marketing strategy, to develop plans, and to make evaluations. Examples of demographics for marketing include age, gender, income level, race, and ethnicity to name a few. In particular, understanding consumer behavior, such as how consumers interact with a particular website, group of websites, or any other resource based on demographics help organizations make better decisions, for example, that improve traffic flow to their website or an objective of their website. In addition, understanding an audience visitation and habits may be useful in supporting advertising planning, buying, and selling.

SUMMARY

In general, systems, components, methods, and techniques for gathering, recording, and development of accurate user demographics attributed to accesses by client systems of webpage, web content, or other online resources is provided. For a given subset of unique users having known demographics for a segment of traffic or general population, a demographic profile may be created for all users of the segment or population within a tolerable margin of error. Demographic data for unique machine identifications (IDs) may be assigned, aggregated, and derived from a single source, or multiple sources, such as panel data, beacon level surveys, cookie exchanges, and the overlay of profile cookies from other publishers.

In one aspect, a system configured to assign demographics to a population of data, the system comprises: one or more processing devices configured to: determine a unique client identifier associated with a beacon for web content; send a request including the unique identifier to a source of demographic information; receive information from the source in response to the request including demographic information and a time event associated with user interaction with a resource; determine the potential likelihood that the user generating the beacon is the user that interacted with the resource; assigning the received demographics to the unique client identifier based on the potential likelihood; and a database configured to store a record of the unique client identifier and assigned demographics.

The system also may determine the potential likelihood that the user generating the beacon is the user that interacted with the resource by comparing a time associated with the beacon and the time event.

The system also may to assign the demographics to the unique client identifier based on the potential likelihood, includes assigning the demographics when the time event occurs within a predetermined period of time.

The unique client identifier may be a client system IP address and user agent combination. In addition, the time event is a user login event associated with the resource.

The system also may receive a beacon message including the unique client identifier and uniform resource locator of the web content; and associate a time with receiving the beacon message.

The system also may determine a relative reliability for the assigned demographics as compared to a standard reliability; and assign the determined reliability to the demographics.

The system also may aggregate a plurality of the unique client identifiers; assigned demographics; and determined reliabilities by source of demographics to derive a demographic distribution for a subset of a population.

The system also may apply the derived demographic distribution to a population to assign demographics to data of the population; and store in the database a record of the assigned demographic data for the population.

The system also may generate a report from the assigned demographic data showing the demographics of the population.

The system also may send a request to the source and receive information from the source in response to the request by sending the request to one of a cookie exchange and a profile exchange; and by receiving information from the cookie exchange or the profile exchange.

In another general aspect, a computer implemented method of assigning demographics comprises: determining, by one or more processing devices, a unique client identifier associated with a beacon for web content; sending, by one or more processing devices, a request including the unique identifier to a source of demographic information; receiving, by one or more processing devices, information from the source in response to the request including demographic information and a time event associated with user interaction with a resource; determining, by one or more processing devices, the potential likelihood that the user generating the beacon is the user that interacted with the resource; assigning, by one or more processing devices, the received demographics to the unique client identifier based on the potential likelihood; and storing, in a database of a storage device, a record of the unique client identifier and assigned demographics.

Determining the potential likelihood that the user generating the beacon is the user that interacted with the resource also may include comparing a time associated with the beacon and the time event.

Assigning the demographics to the unique client identifier based on the potential likelihood, also may include assigning the demographics when the time event occurs within a predetermined period of time.

The unique client identifier is a client system IP address and user agent combination. In addition, the time event is a user login event associated with the resource.

The method also may include receiving a beacon message including the unique client identifier and uniform resource locator of the web content; and associating a time with receiving the beacon message.

The method also may include determining, by one or more processing devices, a relative reliability for the assigned demographics as compared to a standard reliability; and assigning the determined reliability to the demographics.

The method also may include aggregating, by one or more processing devices, the unique client identifier, assigned demographics, and determined reliability by source of demographics to derive demographic distribution for a subset of a population.

The method also may include applying, by one or more processing devices, the derived demographic distribution to a population to assign demographics to data of the population; and storing, in a database of a storage device, a record of the assigned demographic data for the population.

The method also may include generating, by one or more processing devices, a report from the assigned demographic data showing the demographics of the population.

Sending a request to the source and receiving information from the source in response to the request also may include sending a request to one of a cookie exchange and a profile exchange and receiving information from the cookie exchange or the profile exchange.

In another general aspect, a system configured to assign demographics to a population of data comprises: a database configured to store data for a population including data for a segment of the population, the data for a segment of the population including beacon data having associated demographic data assigned from one or more sources of demographics; and one or more processing devices configured to: access the database and the segment data; process the segment data to determine results for the segment for the demographics assigned from each source of demographics; determine a relative reliability of the demographic data from each source of demographics; apply the determined relative reliability to the results for the segment for each source of demographics to normalize the demographic data for each source of demographics; aggregate the normalized demographic data for each source of demographics for the segment to derive a demographic distribution for the segment; and apply the derived demographic distribution to the population to assign demographics to the population of data.

The system also may generate a report from the assigned demographic data showing the demographics of the population.

The database also may store beacon data having associated demographic data assigned from multiple sources of demographics including exchanged centric data, profile centric data, and panel centric data.

The system also may determine a relative reliability of the demographic data from each source of demographics by comparing the reliability of the demographic data from the source to the reliability of panel centric demographic data.

In yet another aspect, a computer implemented method of assigning demographics to a population of data comprises: receiving data for a population including data for a segment of the population, the data for a segment of the population including beacon data having associated demographic data assigned from one or more sources of demographics; processing, by one or more processing devices, the segment data to determine results for the segment for the demographics assigned from each source of demographics; determining, by one or more processing devices, a relative reliability of the demographic data from each source of demographics; applying, by one or more processing devices, the determined relative reliability to the results for the segment for each source of demographics to normalize the demographic data for each source of demographics; aggregating, by one or more processing devices, the normalized demographic data for each source of demographics for the segment to derive a demographic distribution for the segment; and applying, by one or more processing devices, the derived demographic distribution to the population to assign demographics to the population of data.

The method also may include generating, by one or more processing devices, a report from the assigned demographic data showing the demographics of the population.

The method also may include storing, in the database, beacon data having associated demographic data assigned from multiple sources of demographics including exchanged centric data, profile centric data, and panel centric data.

Determining a relative reliability of the demographic data from each source of demographics also may include comparing the reliability of the demographic data from the source to the reliability of panel centric demographic data.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1:
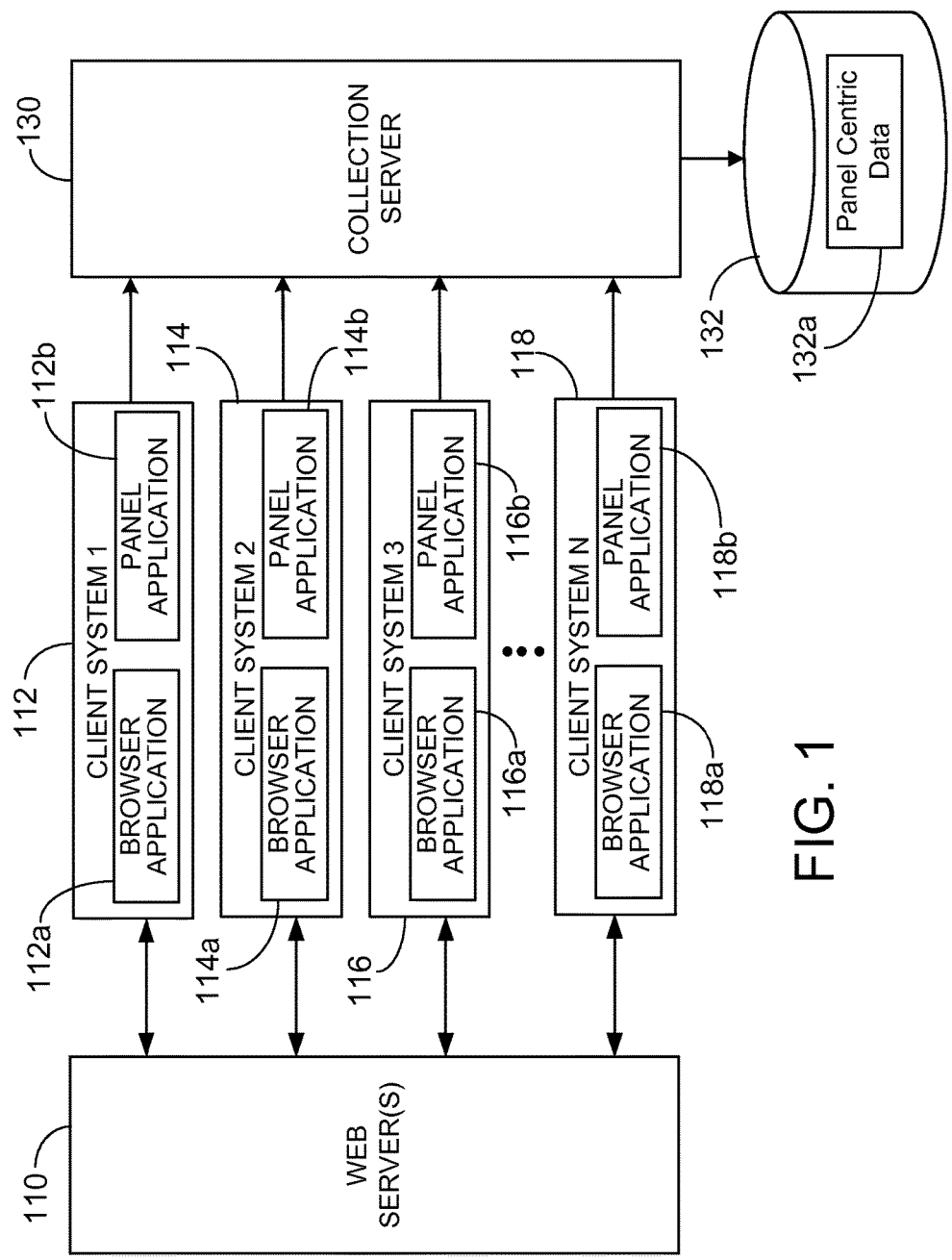
FIG. 1 illustrates an example of a system in which a panel of users may be used to perform Internet audience measurement.

In general, the following description provides systems, components, methods, and techniques for gathering, recording, and developing accurate user demographics attributed to accesses by client systems of a webpage, web content, or any other resources. As described below given a subset of unique users having known demographics for a segment of traffic or a general population, a demographic profile may be created for all users of the segment or the population within a tolerable margin of error. Demographic data for unique client or machine identifications (IDs) can be derived from a single source, or multiple sources, such as panel data, beacon level surveys, cookie exchanges, and the overlay of profile cookies or profile data from other publishers. The collection, scope, and usage criteria for each of these sources are discussed below.

Data about resource accesses can be collected using a panel-based approach or a beacon-based approach. A panel-based approach generally entails installing a monitoring application on the client systems of a panel of users that have agreed to have their systems monitored. The monitoring application then collects information about the webpage or other resource accesses and sends that information to a collection server. A beacon-based approach generally involves associating a script or other code with the resource being accessed such that the code is executed when a client system renders or otherwise employs the resource. For example, when executed by the client system, the beacon code sends a message to a collection server. The message includes certain information, such as an identifier of the resource accessed, a unique identifier of the client system (e.g., the combination of an IP address, a user agent of a client machine), and a time of the event. Although this information is very useful, the information does not necessarily include demographics. In one example, demographics may be supplied by one or more third party sources and then assigned to the information. However, the reliability of the demographics assigned from any given source may vary, which creates difficulties or inaccuracies when trying to determine reliable metrics from this data, particularly when aggregating across multiple, different sources. As a result, decisions made from the metrics may not be optimal or accurate.

In general, panel data forms potentially the smallest demographic source. However, panel data often provide the most accurate, in-depth demographics reflecting persons active on a client device/machine. Panel data are collected through surveys (i.e., self-reported data), direct observation of online data, or through third-party matches. Generally speaking, self-reported data take highest priority in reporting, followed by direct observation, and finally a third party match.

A cookie network based on requests to a beacon also may be maintained. These cookies contain a unique ID but no demographic information by default. Demographics may be associated with the cookie through a relationship with a cookie exchange. A cookie exchange is a service that utilizes data partnerships, online surveys, and/or panels to aggregate and assign demographics to cookies maintained in their network. A publisher or ad network that wishes to understand the demographic of a particular visitor to page, queries the network with a unique identifier, such as an IP address, user agent combination, and time of the visit. The cookie exchange attempts to match the information provided in the query with information in the exchange database and, if available, returns demographics associated with any match that is made. Demographics provided by the cookie exchange are assigned based solely on coincidental events with cookie exchange markers. However, these demographics usually are not tied directly to explicit logins or other identifying sessions that can be used to further validate the demographics.

Similar to the cookie exchange, a beacon level survey provides the ability to associate demographics to the cookie through a single coincidental event. In this case, upon a request for web content a survey is provided asking the user a set of demographics questions. Once the user responds, any demographics provided in response to the survey are applied to any beacon event for that cookie. However, the applied demographics are assigned to the cookie and not a specific login or profile.

In yet another example, profile cookies may be used to provide a relationship where a publisher or a service provides login event and demographic profile information for their user base. The exchange of information is similar to that of a cookie exchange described above. Information is provided to the publisher or the service including a particular unique identifier (e.g., an IP address/user agent/time event). The data returned from the publisher include time events (e.g., last login or accessed time) and demographics.

While any of these sources of data can be used separately to associate demographics with a given beacon, using multiple sources together may increase the accuracy of reports generated based on the beacon information. The following describes examples of systems implementing panel-based and beacon-based approaches to collecting data about resource accesses. In addition, examples of techniques for using the data collected from one or both approaches together to aggregate data for a single source and across multiple sources, and use the aggregate data to derive demographic distributions across larger segments or populations. The various implementations of these techniques described herein do so while accounting for the possibility of multiple users using a given client system. Furthermore, the various implementations of these techniques described herein do so while accounting for variances in the reliability of one or more sources of demographic information which make accurate reporting more difficult.

FIG. 1 illustrates an example of a system 100 in which a panel of users may be used to collect data for Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about the accessing of the resource is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using any a special-purpose or general purpose processing device or computer capable of responding to and executing instructions in a defined manner, for example, a personal computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy or load balancing. In other implementations, the client systems 112, 114, 116, and 118 may send data to different collection servers. In this implementation, the data, representing data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies.

The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited and agrees to participate in the panel, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112*b*, 114*b*, 116*b*, and 118*b*, also referred to as a panel application, is installed on each of the client systems 112, 114, 116, and 118. Accordingly, when a user of one of the client systems 112, 114, 116, or 118 employs, for example, a browser application 112*a*, 114*a*, 116*a*, or 118*a* to visit and view web pages, information about these visits may be collected and sent to the collection server 130 by the monitoring application 112*b*, 114*b*, 116*b*, and 118*b*. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses, and may collect beacons sent from the client machine, as described below. The collection server 130 receives and records this information. The collection server 130 aggregates the recorded information from the client systems and stores this aggregated information in the database 132 as panel centric data 132*a*.

The panel centric data 132*a* may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, these data may be used to estimate the number of unique visitors (or client systems) visiting certain web pages or groups of web pages, or unique visitors within a particular demographic visiting certain web pages or groups of web pages. These data may also be used to determine other estimates, such as the frequency of usage per user (or client system), average number of pages viewed per user (or client system), and average number of minutes spent per user (or client system).

As described further below, such estimates and/or other information determined from the panel centric data may be aggregated with data from beacon-based approaches to derive a distribution for a general population while improving the overall accuracy of such derivations. In particular, demographics of the panel data may be compared to demographics assigned to the beacon based approaches to determine a relative reliability of the assignment as compared to the panel to facilitate aggregation of demographics supplied from one or more different sources.

Figure 2:
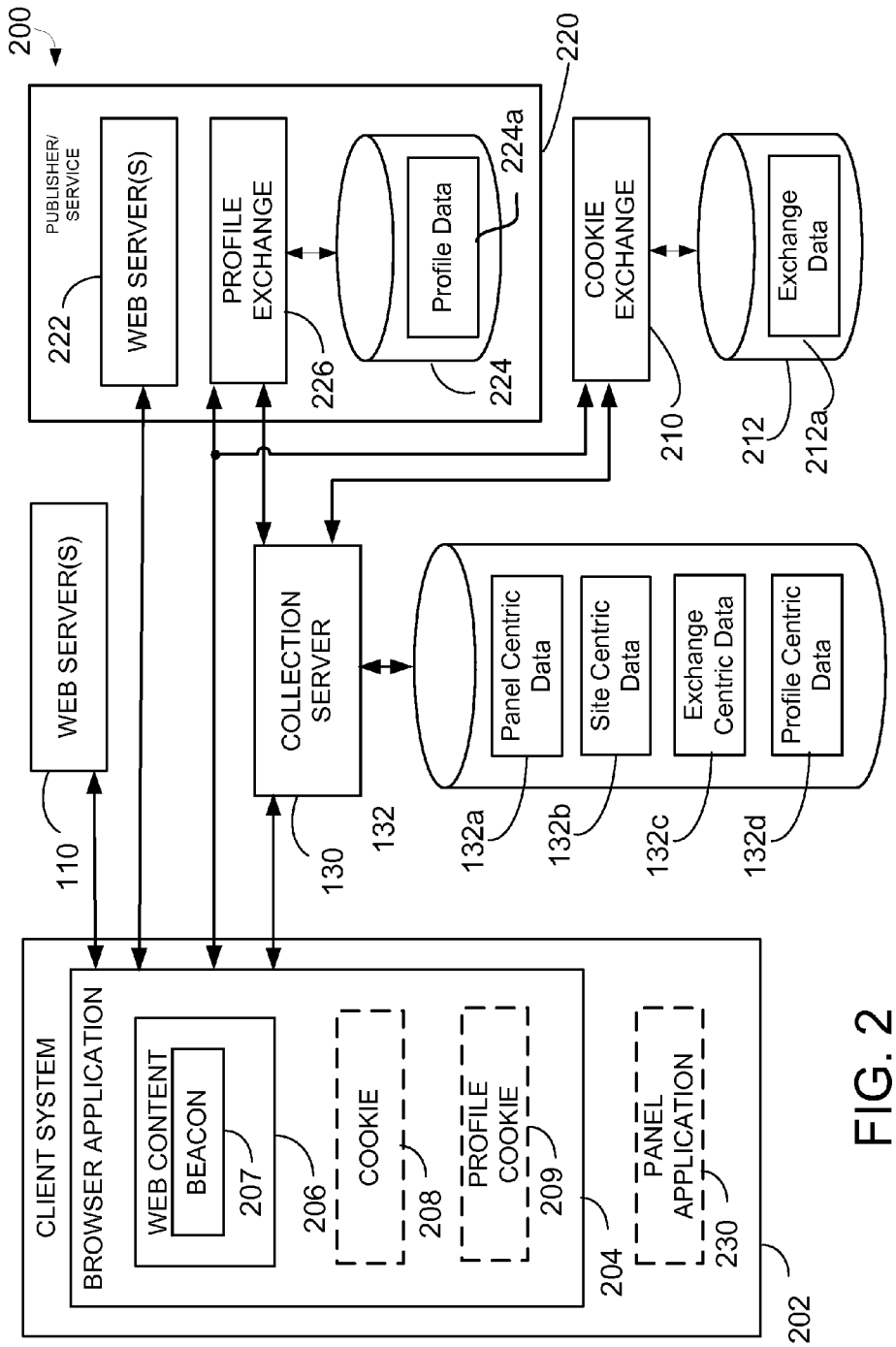
FIG. 2 illustrates an example of a system in which census data can be obtained by including beacon code in web content and assigned demographic information obtained from various sources.

Referring to FIG. 2, an example of a beacon-based approach is shown that may be implemented using a system 200. In general, a beacon-based approach may entail including beacon code in web content that is executed when rendered by a browser operating on a client system.

System 200 includes one or more client systems 202, web servers 110, collection servers 130, corresponding collection database 132, one or more a cookie exchange services 210, and one or more publisher/service providers 220 having a profile exchange. The client systems 202 can include client systems 112, 114, 116, or 118, which have the panel application installed on them, as well as client systems that do not have the panel application installed.

The client systems 202 include a browser application 204 that retrieves web content 206 from web servers 110 and renders the retrieved web content. The web content 206 can be, for example, a web page or an advertisement in a web page. Some web content 206 includes a beacon code 207. In general, publishers of the web content may agree with the entity operating the collection server 130 to include the beacon code in some or all of their web pages or web content. The beacon code 207 is rendered with the web content in which the beacon code 207 is included. When rendered, the beacon code 207 causes the browser application 204 to send a message to the collection server 130. The beacon message includes certain information, such as the URL or other identifier of the web content in which the beacon code 207 is included. For example, the beacon code 207 may be JavaScript code that accesses the URL of the web content in which the code is included, and sends to the collection server 130 an HTTP Post message that includes the URL in a query string. Similarly, the beacon code 207 may be JavaScript code that accesses the URL of the web content in which the code is included, and includes that in the URL in the source or "src" attribute of an <img> tag, which results in a request for the resource located at the URL in the "src" attribute of the <img> tag to the collection server 130. Because the URL of the web content is included in the "src" attribute, the collection server 130 receives the URL of the web content. The collection server 130 can then return a transparent image. The following is an example of such JavaScript:

```
<script type="text/javascript">
document.write("<img       id='img1'       height='1'
width='1'>");document.getElementById("img1").src="http://example.-
com/scripts/report.dll?C7=" + escape(window.location.href) +
"&rn=" + Math.floor(Math.random( )*99999999);
</script>
```

The collection server 130 records the web content URL received in the beacon message with, for instance, a time stamp of when the beacon message was received, the IP address of the client system from which the beacon message was received, and the user-agent of the browser application 204. The collection server 130 aggregates the recorded information and stores the aggregated information in the database 132 as site centric data 132b.

The beacon message also may include a unique identifier for the client system. For example, when a client system first sends a beacon message to the collection server 130, a unique identifier may be generated by the collection server 130 for the client system (and associated with the received beacon message). That unique identifier may then be included in a cookie 208 that is set on that client system 102. As a result, later beacon messages from that client system may have the cookie 208 appended to them such that the messages include the unique identifier for the client system. If a beacon message is received from the client system 202 without the cookie (e.g., because the user deleted cookies on the client system), then the collection server 130 may again generate a unique identifier and include that identifier in a new cookie set on the client system 202.

Thus, as users of client systems 202 access web content (e.g., on the Internet), the client systems 102 also access the web content that includes the beacon code 207, which results in beacon messages being sent to the collection server 130. The beacon messages indicate the web content, such as, for example, an advertisement, that was accessed by the client system 202 (e.g., by including the URL for the web content) and a unique identifier for the client system 202 that sent the beacon message. When a beacon message is received at the collection server 130, a record may be generated for the received beacon message. The record may indicate an identifier (e.g., the URL) of the webpage or other content accessed by the client system 202, the unique identifier for the client system 202, a time at which the client system 202 accessed the webpage (e.g., by including a time stamp of when the message was received by the collection server 130), a network address, such as an IP address, of the client system 202 that accessed the webpage, and a user-agent of the browser application 204. The collection server 130 may then aggregate these records and store the aggregated records in the database 132 as site centric data 132b. Although this information is useful, it may not have any demographics associated with the beacon hit. However, it is possible to assign demographics using various methods described below.

The beacon code 207 may include instructions to access a cookie exchange 210 prior to generating the beacon message. In this case, the beacon code 207 queries the cookie exchange 210 by providing unique identifying information of the client system 202, such as a particular IP address/user agent/time event. The cookie exchange 210 matches the provided information against their database 212 and, if available, returns any associated demographics. The beacon message is then sent to the collection server 130 with any demographics and cookie 208 appended (and/or other unique identifier, such as an IP address/user agent combination) in addition to the web content URL. As described above, if the beacon message is received from the client system 202 without the cookie 208, then the collection server 130 may again generate a unique identifier and include that identifier in a new cookie set on the client system 202. The collection server 130 records the web content URL, cookie/ID information, and demographics received in the beacon message with, for instance, a time stamp of when the beacon message was received. The collection server 130 aggregates this recorded information and stores this aggregated information in the database 132 as exchange centric demographic data 132c.

In another example, the client system 202 also may access a publisher or service provider 220 that results in some event for which a record with an associated timing event is created or recorded by the publisher/service provider 220. For example, access to the web server 222 of the publisher/service provider 220 by the browser 204 may require the user to login into or otherwise identify themselves to the web server 222. The publisher/service provider 220 generates information, such as a record of the user's activity including a time stamp of the activity. The information or record may be stored in a database 224 as part of user profile data 224a maintained for users of the publisher/service provider 220. The user profile data also may include demographic data (e.g., demographic data associated with a user's account or unique ID). In addition, the publisher/service provider 220 can download a profile cookie 209 to the browser of the client system 202. The profile cookie 209 may include the event time stamp and demographic data, among other things.

In one example, the beacon code 207 may include permissions to access the profile cookie 209. In this case, when the beacon code 207 is executed, a beacon message is generated in real time that also includes information from the profile cookie 209, such as the event time stamp and the demographics information. In another example, the beacon code 207 may include instructions to access the profile exchange 226 of the publisher/service provider 220 prior to generating the beacon message (e.g., if the client device does not include a profile cookie). In this case, the beacon code 207 queries the profile exchange 226 by providing a profile ID from the profile cookie or other unique identifying information, such as a particular IP address/user agent/time event. As with the cookie exchange, the profile exchange 226 attempts to match the information provided in the query with information in the database 224 and, if available, returns an event time (e.g., a login event time) and any associated demographics.

The beacon code 207 also may include instructions to provide or access a survey that provides the ability to associate demographics through a single coincidental event to the cookie 208. In this case, upon a request for the web content a survey is provided, via the browser 204 on client system 202, to the user presenting a set of demographics questions. Once the user responds, any demographics provided in the survey are applied to any beacon event for that cookie 208. However, the applied demographics are assigned to the cookie 208 and not a specific login or user profile.

In any of these examples, the beacon message is sent to the collection server 130 with the profile or demographic information and event time (e.g., login time) included. The collection server 130 records the web content URL received in the beacon message with, for instance, a time stamp of when the beacon message was received and the IP address/user agent of the client system from which the beacon message was received along with the profile centric information. The collection server 130 aggregates this recorded information and stores this aggregated information in the database 132 as profile demographic centric data 132d.

In another example, the collection server 130 may query the cookie exchange 210 or the profile exchange 226 (instead of the beacon code 207 as described above) after receiving the beacon message (e.g., that does not have any associated demographics). The query by the collection server 130 may be made in real time as the beacon message is received or at a later time, for example, as a query for a batch of beacon messages corresponding to the site centric data 132b. For example, the collection server 130 can query the cookie exchange 210 by providing a time stamp of when a beacon message was received and unique identification, such as the IP address/user agent of the client system 202. The cookie exchange 210 attempts to match the provided information with information in their database 212 and, if available, returns any demographics associated with the information. The collection server 130 then assigns any demographic data to the appropriate beacon records, which include the web content URL received in the beacon message and the IP address/user agent of the client system 202. The collection server 130 aggregates this recorded information and stores this aggregated information in the database 132 as exchange centric demographic data 132c. Similarly, the collection server 130 also may query the profile exchange 226 by providing a time stamp of when a beacon message was received and the IP address/user agent of the client system 202. The profile exchange 226 attempts to match the provided information with information in the profile database 224 and, if available, returns any associated demographics and a time of an event (e.g., a login event). The collection server 130 then assigns any demographic data returned in response to the query with the appropriate beacon records, which include the web content URL received in the beacon message and the IP address/user agent of the client system. The collection server 130 aggregates this recorded information and stores this aggregated information in the database 132 as profile centric demographic data 132d.

The beacon messages are sent regardless of whether or not the given client system 202 has a panel application 230 installed, for example, a panel application, such as 112, 114, 116, and 118a, as described above with regard to FIG. 1. But, for client systems 202 in which the panel application 230 is installed, the panel application 230 also records and reports the beacon message to the collection server 130. For example, if the panel application 230 is recording HTTP traffic, and the beacon message is sent using an HTTP Post message (or as a result of an <img> tag), then the beacon message is recorded as part of the HTTP traffic recorded by the panel application 230, including, for instance, any cookies that are included as part of the beacon message. Thus, in this instance, the collection server 130 receives the beacon message as a result of the beacon code 207, and a report of the beacon message as part of the panel application's recording and reporting of network traffic.

Because the beacon message is sent regardless of whether the panel application is installed, the site centric data 132b, exchange demographic centric data 132c, and profile demographic centric data 132d directly represents accesses by the members of the larger universe to be measured, and not just the members of the panel. As described further below, the panel-centric data 132a can be used to determine a relative reliability of the demographics assigned to the beacon hits from different sources and thereby facilitate aggregation across multiple sources.

The demographic aggregation approach described herein may take into account the relative accuracy of different sources versus a known set, and additionally take into account multiple users per machine. Once quantified, beacons associated with varying demographic sources can be combined in a consistent way to build a distribution of the demographic makeup of a segment or a population taking into account, for example, variance across sources. Reliability is a measure of the belief in the relative accuracy of the source of demographics assigned to the data stored by the collection server. In one example, the panel group or subset of the panel may be used as a standard having high reliability. The reliability of any source can be determined against the panel's reliability to derive a normalized reliability for each source of demographic data. Of course other data or demographic group having a high reliability can be used as the standard reliability; however, regardless of the standard picked, all sources being aggregated for one segment or population can be compared to the same standard. The basic score for any one source is used to assess the relative accuracy of the demographic assigned to the record and may determine its impact in the overall aggregation.

Each of the client system 202, the collection server 130, and the web server 222, profile exchange 226, cookie exchange 210 may be implemented using one or more special-purpose or general-purpose computers capable of responding to and executing instructions in a defined manner, such as, for example, a personal computer, a notebook/ultrabook computer, a tablet computer, a laptop computer, a computer workstation, a computer server, a set top box, or a mobile device or phone. Client system 202, collection server 130, and web server 222, profile exchange 226, cookie exchange may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 202, the collection server 130, and the web server 222, profile exchange 226, cookie exchange 210. In addition, the databases 132, 224, and 212 may be implemented using one or more mass storage devices or memories.

In the example shown in FIG. 2, the system 200 shows only one client system 202 for simplicity; however, it is understood that in any such system there are multiple client systems 202. Similarly, in the example shown in FIG. 2, there is a single collection server 130, publisher service 220, web server 222, profile exchange 226, and cookie exchange 210. However, in actual implementation there may be more than one of these. For example, a client system 202 may access data or use resources from multiple publisher services 220, may send data to more than one collection server 130 for redundancy or load balancing, or query multiple web servers 222, profile exchanges 226, and cookie exchanges 210. In other implementations, the client system 202 may send data to different collection servers. In this implementation, the data, representing data from a community of users may be communicated to and aggregated at a central location for later processing. In one example, the central location may be one of the collection servers. In addition, the collection servers may receive beacon messages from a plurality of client devices 202 and query multiple profile exchanges 226 and cookie exchanges 210.

Figure 3:
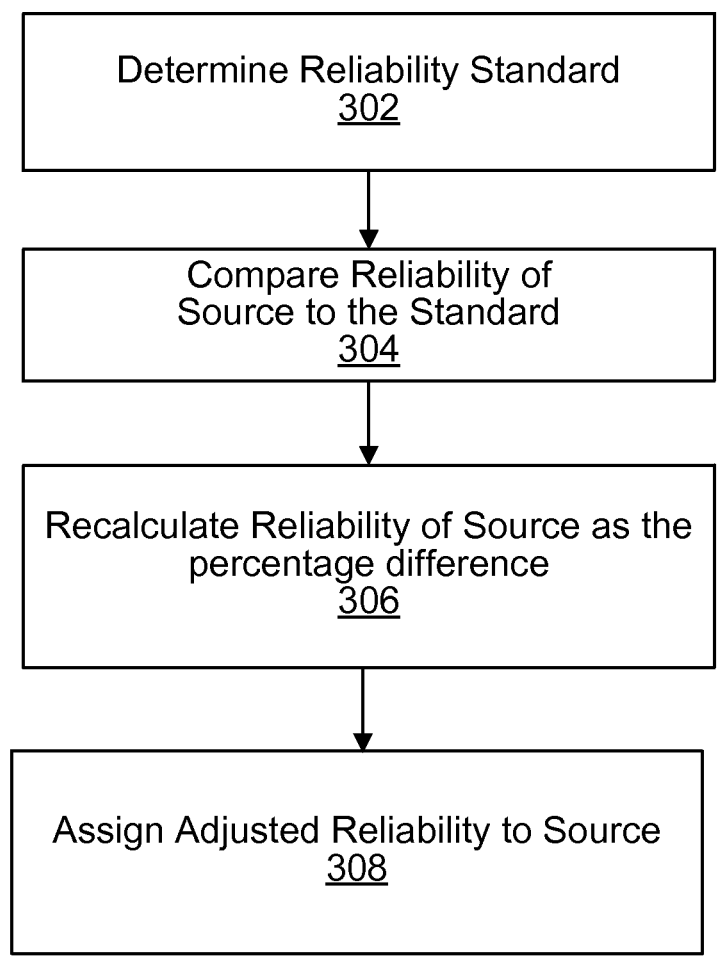
FIG. 3 is a flow chart illustrating an example of a process to determine relative reliability of different sources of demographic data.

FIG. 3 is a flow chart illustrating an example of a process to determine relative reliability of different sources of demographic data. First, a standard reliability is determined (302). The standard reliability may be derived from known occurrences or other sources that provide highly accurate demographic data that can be used as a benchmark for comparison to the reliability of other sources. In one example, panel centric data may be used as these data, when they embody the most accurate, most in-depth demographics reflecting persons that are active on a client system concurrent with the beacon hit. Next, the reliability of a source is compared to the standard reliability (304). The reliability of source is recalculated as the percentage difference between the source reliability and the standard reliability (306). Subtracting the difference from a probability of 1 gives the adjusted probability of the source. The adjusted or normalized reliability is assigned to the source (308).

Figure 4A:
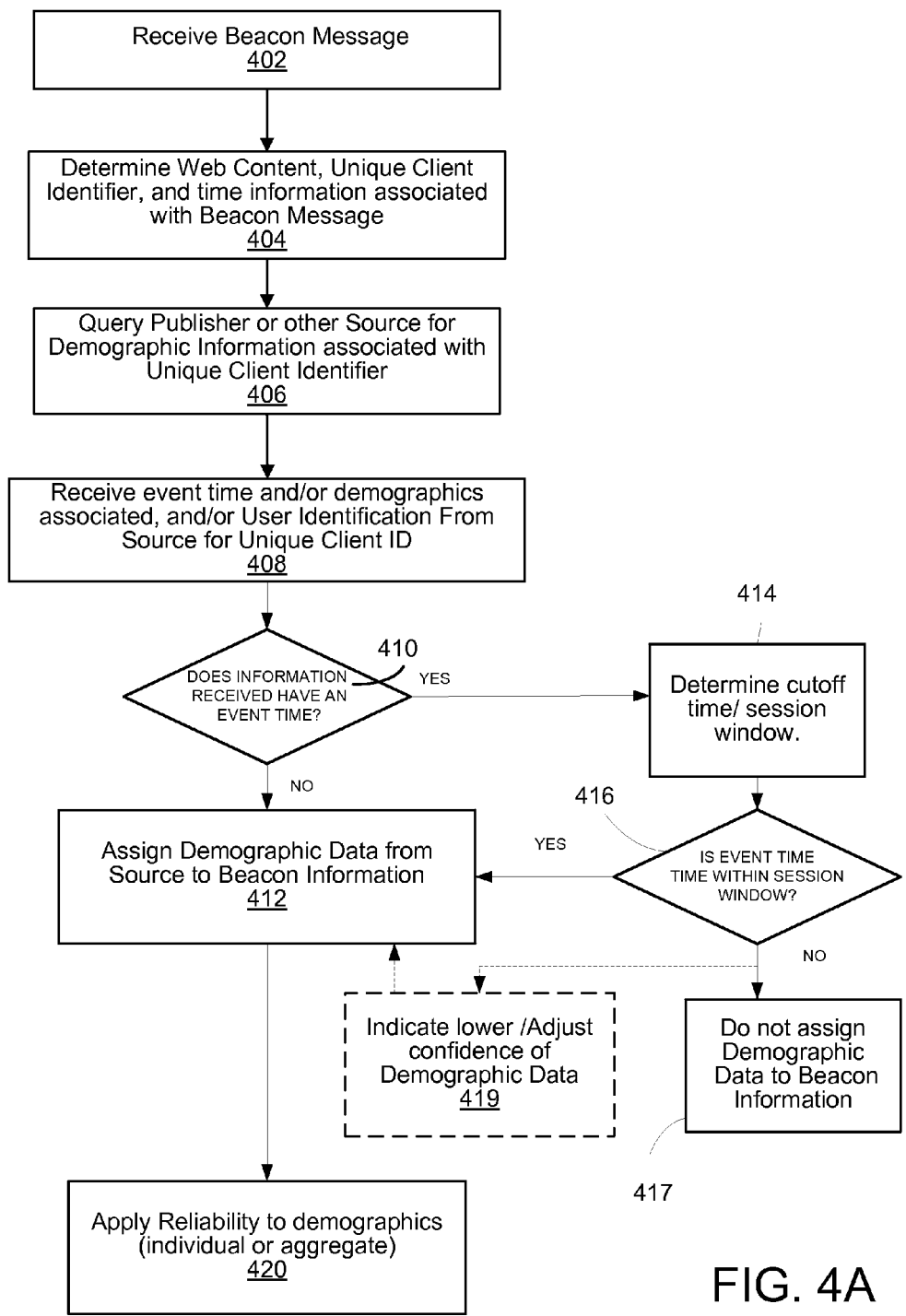
FIGS. 4A and 4B are flow charts illustrating an example of processes for applying reliability to census data while accounting for possible multiple users of a single client device and thereby improve the reliability associated with assigned demographic data.
Figure 4B:
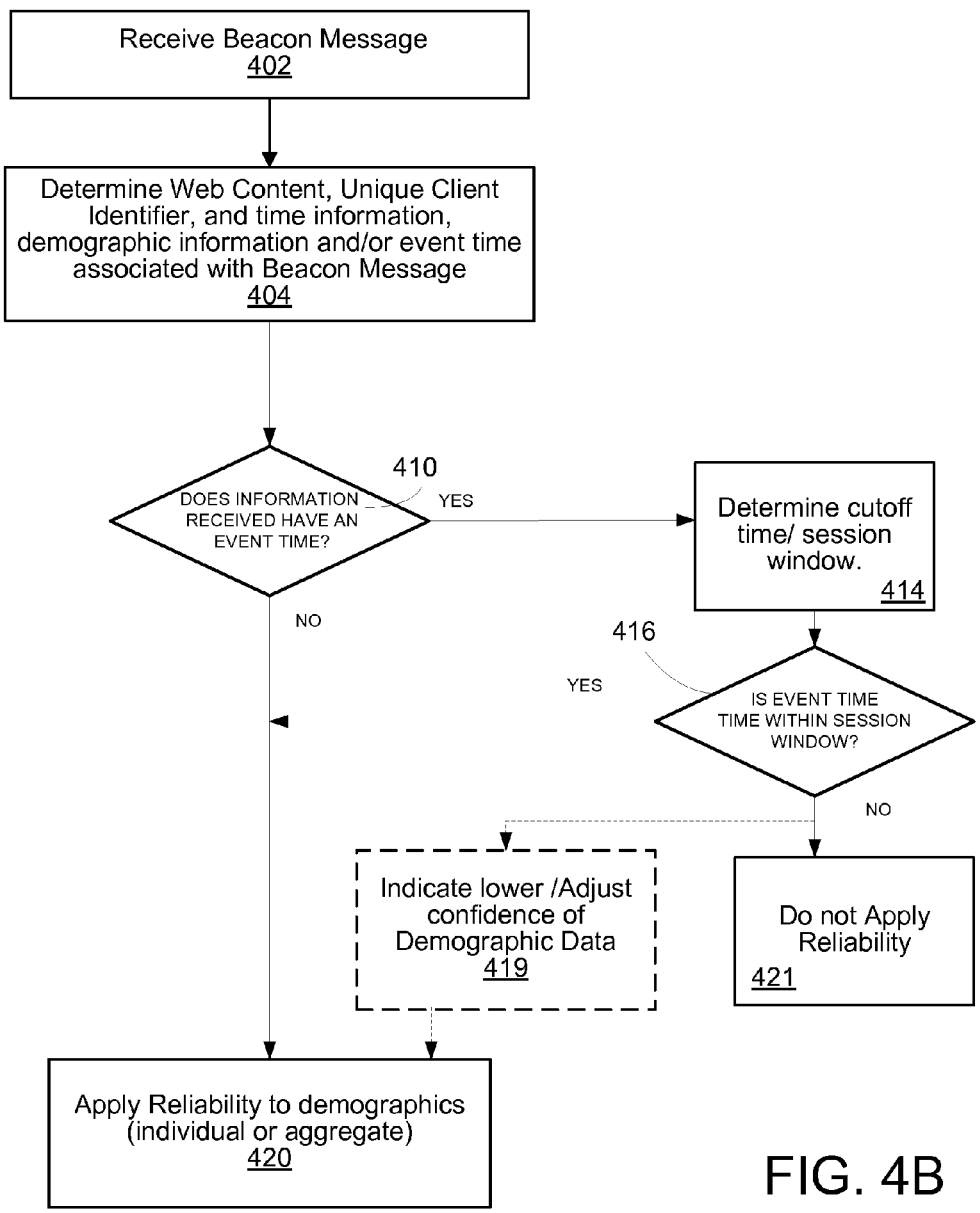

FIGS. 4A and 4B are flow charts illustrating an example of processes for applying reliability to census data while accounting for possible multiple users of a single client device and thereby improve the reliability associated with assigned demographic data. FIG. 4A illustrates an example of process for applying reliability when the beacon message does not include demographic data and FIG. 4B illustrates an example of process for applying reliability when the beacon message does include demographic data.

As shown in FIG. 4A, a collection server may receive a beacon message (402). The Web Content, Unique Client Identifier, and time information associated with Beacon Message is determined (404). For example, the Web Content may be an advertisement identified by a URL. The unique client identifier may be a client system IP address, user agent combination. The time information may be a time stamp of the received message. A determination is made whether the Beacon Message includes demographic data (405). If the beacon message does not include demographic data, the collection server queries a publisher or other source for demographic information by providing the unique client identifier (e.g., IP address, user agent combination) (406). The collection server receives any profile event time and/or demographics from the source corresponding to the unique client ID (408). The collection server may potentially receive a profile user identification in addition to the profile time and demographics.

The collection server then determines whether the demographics have an associated profile event time (410). In the event the source is a profile exchange, the publisher or service records time information for an event, such as for example, a login event in addition to the demographic profile information for their user base. In some cases, similar to the beacon level survey and cookie exchanges, profile cookies of the publisher or server records also can be associated with particular beacon event such as an ad call. However, because there is an explicit confirmation of a user identity through the login event, the demographics can be seen as more reliable in this instance.

If the demographics do not have an associated profile event time, the collection server assigns the demographic data from source to the beacon information (412).

If the demographics do have an associated profile event time, the collection server determines a cutoff time or session window of time. In the case of a profile event, the further the beacon message is from the profile event (e.g., a user login) for a client system that has multiple users, the more likely it is that the actual user causing the beacon message may be different than the user identified by the profile exchange or cookie.

The potential likelihood that the user may be different is addressed by determining a cutoff time or a session window of time for any association of demographics made to the beacon message, which provides a high degree of confidence that user identified by the profile exchange is the user logged in on the client system. A number of different approaches may be made to determine the length of the session or cutoff time. One approach is to assign a probability that the user of the client system has switched using analysis, such as, for example, a survival curve or hazard model that is dependent on time from login and number of beacon hits observed for the client system during that time frame. Another approach is to assign a fixed session interval. The fixed session window can be empirically determined and can take into account different information, such as type of device and number of users of the device, if known. In one example, a 30 minute session window may be used to determine whether it is appropriate to apply demographics for a profile cookie to a beacon call.

The collection server determines whether the information received for the event time is within the session window or before the cutoff time (414). If the event time is within the window or prior to the cutoff time, the collection server assigns the demographic data from the profile exchange source to beacon Information (412). If the event time is outside the window or after the cutoff time, the collection server does not assign demographic data to the beacon information. Alternatively, the collection server may still assign demographic data to the beacon but adjust or indicate a lower confidence in the accuracy of that data (419, 412).

Once the demographics are assigned, an adjusted reliability (e.g., as explained above with regard to FIG. 3) may be applied to the demographics individually or as an aggregate for all demographics associated with the same source (418).

As shown in FIG. 4B, a collection server may receive a beacon message (402). The Web Content, Unique Client Identifier, time information, and demographics and/or time event associated with Beacon Message is determined (404).

The collection server then determines whether the demographics have an associated profile event time (410). If the demographics do not have an associated profile event time, an adjusted reliability (e.g., as explained above with regard to FIG. 3) may be applied to the demographics individually or as an aggregate for all demographics associated with the same source (420).

If the demographics do have an associated profile event time, the collection server determines a cutoff time or session window of time. In the case of a profile event, the further the beacon message is from the profile event (e.g., a user login) for a client system that has multiple users, the more likely it is that the actual user causing the beacon message may be different than the user identified by the profile exchange or cookie.

The collection server determines whether the information received for the event time is within the session window or before the cutoff time (414). If the event time is within the window or prior to the cutoff time, the collection server applies an adjusted reliability (e.g., as explained above with regard to FIG. 3) to the demographics individually or as an aggregate for all demographics associated with the same source (420). If the event time is outside the window or after the cutoff time, the collection server does not apply the reliability to the demographic data (421). Alternatively, the collection adjust or indicate a lower confidence in the accuracy of the of the demographic data (419), before applying the adjusted reliability (e.g., as explained above with regard to FIG. 3) to the demographics individually or as an aggregate for all demographics associated with the same source (420).

Once the adjusted reliability has been assigned to the demographic information associated with the information in the beacon message (e.g., cookies), the demographic information from different demographic sources can be combined in a consistent manner to build a distribution of the demographic makeup of a segment or a population because the reliability of data have been normalized for the variance across all sources.

For example, for a cookie assigned a binary demographic (e.g., gender) and a value of choice (e.g., Female):

Let
- $x_i$ = the observed incidence of the demographic (1=Female, 0=Male)
- n = the number of cookies with a known demographic value
- $R_s$ = the reliability of a specific demographic source
- $r_i$ = the reliability of the observation. For the first iteration the reliability is equal to the overall reliability of the source; however, the reliability may vary over time depending on estimates regarding the number of users and the possibility of having multiple demographic sources for a particular cookie.

So for a particular segment let:
- O = the total observed incidence rate for the segment, $(\Sigma x_i)/n$
- T = the true incidence rate of the segment; and
- R = the probability of observing the true value, or the aggregation of the reliability of the cookies with demographics $\Sigma r_i$ So if $O = RT + (1-R)(1-T)$ Then $T = (O - 1 + R)/(2R - 1)$ Adding the details from the individual cookies above gives:

$$T = ((\Sigma x_i + \Sigma r_i) - n)/((2\Sigma r_i) - n)$$

The true incidence rate of the segment T can be expressed similarly using linear algebra and expanded to encompass several categories.

For example, given a k category case:

Let R be a square k by k matrix expressing the conditional probabilities of all the possible observed values conditional on all the actual values.

For example, in the case of k=4, the matrix R=:

|          |   | Actual 1 | Actual 2 | Actual 3 | Actual 4 |
|----------|---|----------|----------|----------|----------|
| Observed | 1 | $P(X_{obs}=1\|X=1)$ | $P(X_{obs}=1\|X=2)$ | $P(X_{obs}=1\|X=3)$ | $P(X_{obs}=1\|X=4)$ |
|          | 2 | $P(X_{obs}=2\|X=1)$ | $P(X_{obs}=2\|X=2)$ | $P(X_{obs}=2\|X=3)$ | $P(X_{obs}=2\|X=4)$ |
|          | 3 | $P(X_{obs}=3\|X=1)$ | $P(X_{obs}=3\|X=2)$ | $P(X_{obs}=3\|X=3)$ | $P(X_{obs}=3\|X=4)$ |
|          | 4 | $P(X_{obs}=4\|X=1)$ | $P(X_{obs}=4\|X=2)$ | $P(X_{obs}=4\|X=3)$ | $P(X_{obs}=4\|X=4)$ |

And making some simplifying assumptions that $R_{ij} = R_{ji}$ and $R_{ii}$ is constant for all i, a reliability matrix is obtained, where $R_{ij} = (1 - R_{ii})/(k-1)$ for i does not equal j and $R_{ii} = 0.85$

| 1 | 2 | 3 | 4 | |
|---|---|---|---|---|
| 0.85 | 0.05 | 0.05 | 0.05 | 1 |
| 0.05 | 0.85 | 0.05 | 0.05 | 2 |

```
0.05  0.05  0.85  0.05  3
0.05  0.05  0.05  0.85  4
```

If $Y_o$ is the vector of the observed category counts and Y is the vector of the true counts then our corrected raw data, $\hat{Y}=R-1\ Y_o$ The binary case is equivalent to the calculations above for T. In the case where R is the identity matrix (with ones on the main diagonal and zeros elsewhere), the transformation is simply the identity transformation.

In this example, using the cookie exchange demographics collected and six age/gender groupings are created (e.g., males and females: 0-34, 35-54, 55+) resulting in the following distribution: (25210,20482,9619,19146,14933, 5454). For a 0.8 reliability and equal off diagonal reliabilities:

```
> n<-94844
> k<-6
> r<-.80
> offdiag<-matrix((1-r)/(k-1),k,k)*(1-diag(1,k))
> diagonal<-diag(r, k)
> Rmatrix<-diagonal+offdiag
> Rmatrix
     [,1] [,2] [,3] [,4] [,5] [,6]
[1,] 0.80 0.04 0.04 0.04 0.04 0.04
[2,] 0.04 0.80 0.04 0.04 0.04 0.04
[3,] 0.04 0.04 0.80 0.04 0.04 0.04
[4,] 0.04 0.04 0.04 0.80 0.04 0.04
[5,] 0.04 0.04 0.04 0.04 0.80 0.04
[6,] 0.04 0.04 0.04 0.04 0.04 0.80
> results<-c(25210,20482,9619,19146,14933,5454)
> p<-solve(Rmatrix, results)/n
> p
[1] 0.29711171 0.23151924 0.08081470 0.21298465 0.15453687
0.02303284
>
```

The adjusted raw is calculated as the inverse of the reliability matrix multiplied by the results matrix. These results indicate that the raw distribution is 63% male as opposed to 67% male for the whole group.

Figure 5:
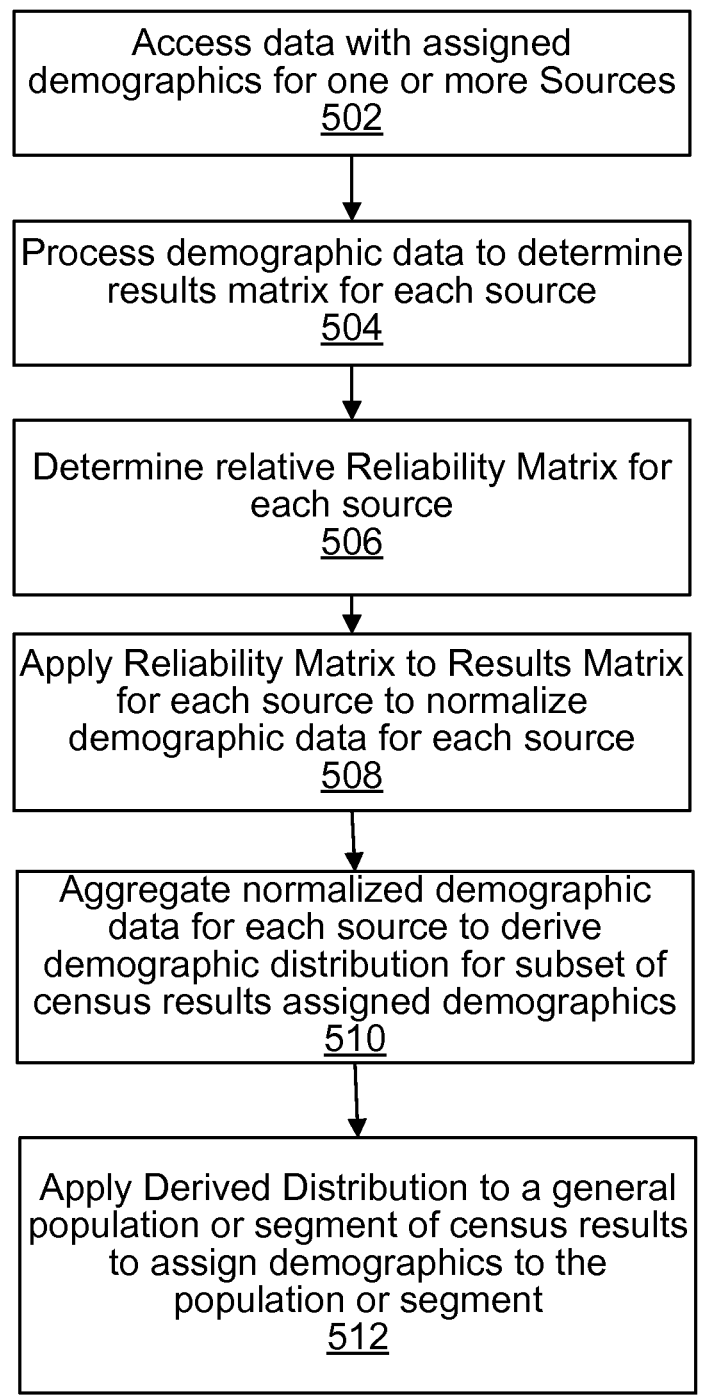
FIG. 5 is a flow chart illustrating an example of a process for aggregating census data across single or multiple sources.

Aggregating results from multiple sources may involve calculating a reliability matrix for each source and multiplying the matrix inverse times the results matrix. Assuming the sources are independent, the resulting adjusted values can be aggregated normally (e.g., as a sum, or a weighted sum). FIG. 5 is a flow chart illustrating one example of a process for aggregating census data across a single or multiple sources.

As shown in FIG. 5, data (e.g., beacon hits or corresponding records from the database 132) with assigned demographics is accessed by the source of the demographics (502). The data with assigned demographics is processed. For example, the data is loaded into a results matrix corresponding to the source (504). If there are multiple sources being aggregated, then a results matrix is determined for each source. Next a relative reliability is determined for each source (506). The relative reliabilities are loaded in a reliability matrix for each source. The relative reliability is applied to the demographic data (508). For example, the reliability matrix is applied to the results matrix. If there are multiple sources being aggregated, then this process is performed for each source to normalize the demographic data for each source. The normalized demographic data for each source is then aggregated to derive a demographic distribution for a subset of census results with the assigned demographics (510). While this shows the reliability of the source applied to the results matrix, in another example, the relative reliability may be applied individually to normalize each data element prior to aggregation and processing for any given source.

The derived distribution is applied to a general population or segment of census results to assign demographics to the population or segment (512). For example, once the demographic distribution is derived for a subset of beacon hits with different sources and reliability information, the derived distribution can be applied directly to the total volume of the census beacon results. That is for a given set of beacons B with a subset of beacons with assigned demographics Bd, the distribution of demographic d to the total is:

$$B^*(B\_d=x)/B\_d$$

where x is a particular value for the demographic (e.g., Males). This general approach can be applied to any combination of demographics or arbitrarily complex segment. As an example, there may be a given total set of beacon hits B for an advertisement (or set of advertisements in an ad campaign), with a subset of those beacons having assigned demographics. The distribution of a given demographic across the total views of the advertisement (as represented by the beacons B) can be determined as noted above.

Figure 6:
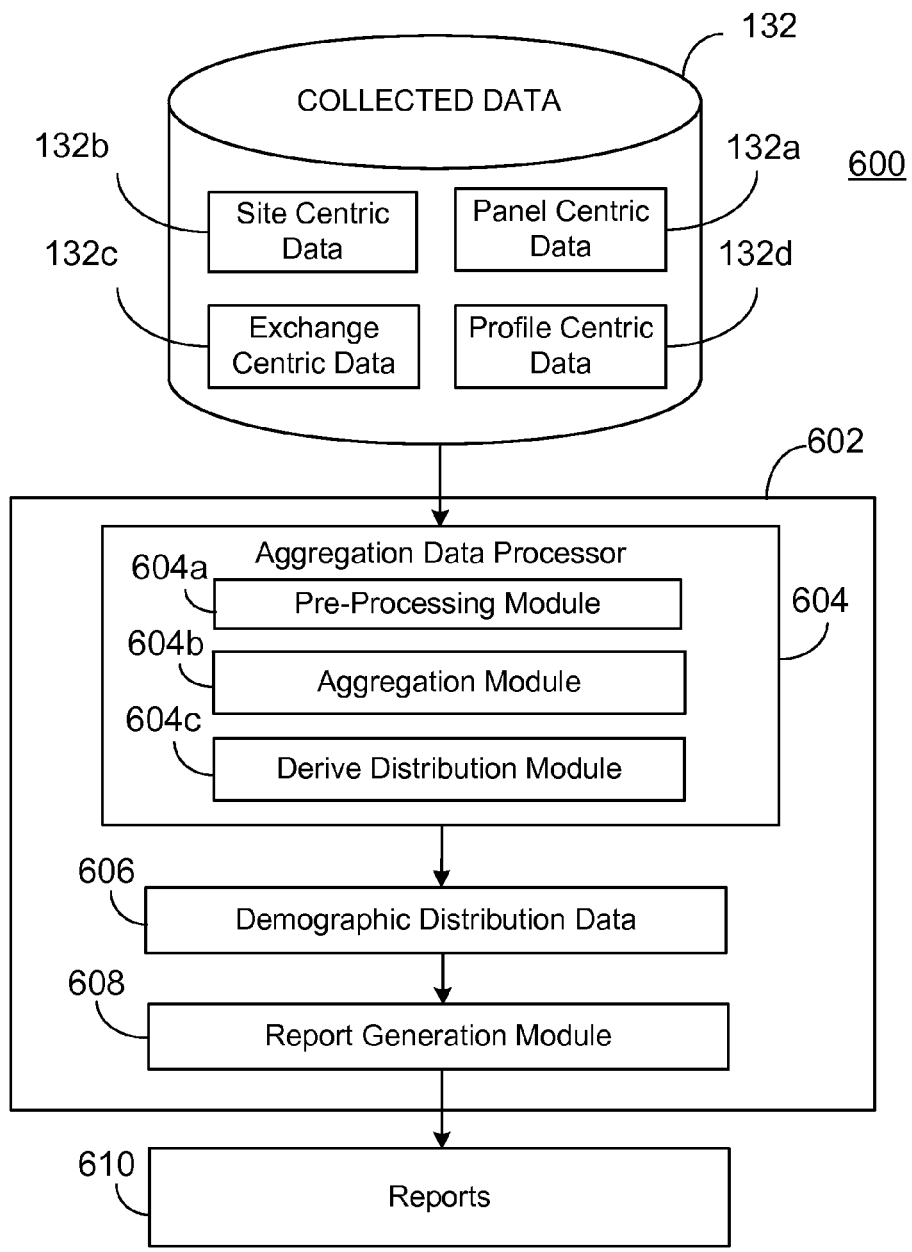
FIG. 6 of illustrates an example of a system configured to implement reliable census data aggregation.

FIG. 6 illustrates an example of a system 600 configured to implement reliable census data aggregation. The system 600 uses the collected panel centric data 132a, site centric data 132b, exchange centric data 132c, and profile centric data 132d to aggregate demographic data across different sources and derive distributions for various segments and populations from the aggregated data. The system 600 includes an aggregation server 602. The aggregation server 602 may be implemented using, for example, a general-purpose or special-purpose computer, such as a personal computer, a workstation, or any processing device capable of responding to and executing instructions in a defined manner. The aggregation server 602 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the aggregation server 602.

The aggregation server 602 executes instructions that implement an aggregation data processor 604 and a report generation module 608. The aggregation data processor 604 includes a pre-processing module 604a, an aggregation module 604b, and a derivation distribution module 604c. The aggregation data processor 604 may implement processes, such as that shown in FIGS. 3, 4, and 5 to generate demographic distribution data 606 based on the panel centric data 132a and site centric data 132b, exchange centric data 132c, and profile centric data 132d. The pre-processing module 604a, accesses and processes the data (e.g., the panel centric data 132a and site centric data 132b, exchange centric data 132c, and profile centric data 132d) to place the data in a format for use by the aggregation module 604b and a derivation distribution module 604c to generate the demographic distribution data. The report generation module 608 may use the demographic distribution data 606 to generate one or more reports 610 that include information regarding client system accesses of one or more resources.

Reports may be generated by the report general module 608 in any number of forms from spread sheets to sophisticated automated, interactive user interfaces (e.g., dashboards) that allow a user to manipulate the demographic distribution data.

Use of normalized demographic data across different sources can be very useful when interpreting the results of any digital traffic scenario where more granularity is desired than is provided by the current "standard" for the digital traffic. For example, normalized demographic data across different sources can be very useful when interpreting effectiveness of an advertising campaign. In one particular example, during an early build of a campaign, or even for the entire campaign, a panel and the generated panel centric data may be too small to provide effective measurements. However, by utilizing the demographics at the cookie level from beacons of many other users, and adjusting them to fit expectations of what is consistent with a panel "standard," the campaigns or even days thereof can be read and measured to understand how well a publisher or advertiser are hitting their targets. As a result, for a given a subset of unique users having known demographics for a segment of traffic or general population, a demographic profile may be created for all users of the segment or population within a tolerable margin of error, such that, for example, limits on the standard size or amount of data may be overcome, among other things. In addition, because demographic data from multiple different sources are normalized, they may be consistently applied or analyzed.

According to the system, processes, and techniques described above accurate demographic assignment may be performed across any user defined segment that may be aggregated in near real time. In addition, the assignment of demographic data from individual sources may account for multiple users providing a more robust system. As a result, derived demographic distributions can be developed with a scope broader than panel based approaches that are normalized to account for variances in reliability of demographic data assigned from different sources thereby providing more accurate demographic derivations than traditional cookie reporting methodologies.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques (e.g., such as those shown in FIGS. 3, 4, and 5) can be performed by one or more programmable processing devices or processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The computers described herein may include one or more processors. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory or solid state drive devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An automated computer system configured to determine and assign demographics to electronic data based on access of an online resource by a client device, the system comprising:

a non-transitory storage device storing an application including instructions;

one or more processing devices operable to access the application and execute the instructions, the instructions causing the one or more processing devices to:

access a message automatically generated when web content associated with a beacon is accessed by the client device;

determine a unique client identifier accompanying the message;

determine a time indicating when the message was received, transmitted, or created;

request information from a cookie exchange associated with the unique client identifier;

receive, in response to the request, information from the cookie exchange including a time of an event indicating when a resource was accessed by the client device and demographic data associated with the access of the resource;

determine the potential likelihood that a user associated with generation of the message is a same user who accessed the resource based on the determined time of the message and the time of the event associated with access of the resource;

assign the received demographic information to the unique client identifier based on the potential likelihood, such that subsequent messages automatically generated when web content associated with the beacon is accessed comprise the demographic information; and store a record of the unique client identifier and assigned demographic information in a database associated with the client device.

2. The system of claim 1, wherein the one or more processing devices are operable to access the application and execute the instructions, the instructions further causing the one or more processing devices to determine the potential likelihood that the user associated with the message is the user associated with the information received from the cookie exchange by comparing the time indicating when the message was received, transmitted, or created and the time of the event associated with access of the resource by the client device.

3. The system of claim 1 wherein the one or more processing devices are operable to access the application and execute the instructions, the instructions further causing the one or more processing devices to assign the demographic information to the unique client identifier based on the potential likelihood by assigning the demographic information to the unique client identifier when the time of the event occurs within a determined period of time, the determined period of time starting from the time when the message was received, transmitted, or created.

4. The system of claim 1 wherein the unique client identifier is a client system IP address and user agent combination.

5. The system of claim 1 wherein the one or more processing devices are operable to access the application and execute the instructions, the instructions further causing the one or more processing devices to:
receive the message, wherein receiving the message includes receiving the unique client identifier and a uniform resource locator of the web content; and
associate a timestamp with receiving the message.

6. The system of claim 1 wherein the time of the event is a time of a user login associated with access of the resource.

7. The system of claim 1 wherein the one or more processing devices are operable to access the application and execute the instructions, the instructions further causing the one or more processing devices to:
determine a relative reliability for the assigned demographic information as compared to a standard reliability; and
assign the determined reliability to the demographic information.

8. The system of claim 7, wherein the one or more processing devices are operable to access the application and execute the instructions, the instructions further causing the one or more processing devices to:
aggregate a plurality of the unique client identifiers;
assign demographic information to the identifiers; and
determine reliabilities associated with the demographic information based on the information received from the cookie exchange to derive a demographic distribution for a subset of a population.

9. The system of claim 8 wherein the one or more processing devices are operable to access the application and execute the instructions, the instructions further causing the one or more processing devices to:
apply the derived demographic distribution to a population to assign demographic information to data associated with the population; and
store in the database a record of the assigned demographic information for the population.

10. The system of claim 9 wherein the one or more processing devices are operable to access the application and execute the instructions, the instructions further causing the one or more processing devices to:
generate a report from the assigned demographic information showing one or more demographics of the population.

11. A computer implemented method of automatically determining and assigning demographics to electronic data based on access of an online resource by a client device, the method comprising:
accessing, by one or more processing devices, a message automatically generated when web content associated with a beacon is accessed by the client device;
determining, by the one or more processing devices, a unique client identifier accompanying the message;
determining, by the one or more processing devices, a time indicating when the message was received, transmitted, or created;
requesting, by the one or more processing devices, information from a cookie exchange associated with the unique client identifier;
receiving, by the one or more processing devices and in response to the request, information from the cookie exchange including a time of an event indicating when a resource was accessed by the client device and demographic data associated with the access of the resource;
determining, by the one or more processing devices, the potential likelihood that a user associated with generation of the message is a same user who accessed the resource based on the determined time of the message and the time of the event associated with access of the resource;
assigning, by the one or more processing devices, the received demographic information to the unique client identifier based on the potential likelihood, such that subsequent messages automatically generated when web content associated with the beacon is accessed comprise the demographic information; and
storing, by the one or more processing devices and in a database associated with the client device, a record of the unique client identifier and assigned demographic information.

12. The method of claim 11, wherein determining the potential likelihood that the user associated with the message is the user associated with the information received from the cookie exchange by comparing the time indicating when the message was received, transmitted, or created and the time of the event associated with access of the resource by the client device.

13. The method of claim 11 wherein assigning the demographic information to the unique client identifier based on the potential likelihood, includes assigning the demographic information to the unique client identifier when the time of the event occurs within a determined period of time, the determined period of time starting from the time when the message was received, transmitted, or created.

14. The method of claim 11 wherein the unique client identifier is a client system IP address and user agent combination.

15. The method of claim 11 further comprising:
receiving the message, wherein receiving the message includes receiving the unique client identifier and uniform resource locator of the web content; and
associating a timestamp with receiving the message.

16. The method of claim 11 wherein the time of the event is a time of a user login associated with access of the resource.

17. The method of claim 11 further comprising:
determining, by the one or more processing devices, a relative reliability for the assigned demographic information as compared to a standard reliability; and
assigning the determined reliability to the demographic information.

18. The method of claim 17, further comprising:
aggregating, by the one or more processing devices, a plurality of the unique client identifiers;
assigning demographic information to the identifiers; and
determining reliabilities associated with the demographic information based on the information received from the cookie exchange to derive a demographic distribution for a subset of a population.

19. The method of claim 18, further comprising:
applying, by the one or more processing devices, the derived demographic distribution to a population to assign demographic information to data associated with the population; and
storing, in the database associated with the client device, a record of the assigned demographic information for the population.

20. The method of claim 19 further comprising:
generating, by the one or more processing devices, a report from the assigned demographic information showing one or more demographics of the population.

21. A system configured to assign demographics to a population of data, the system comprising:
a storage device storing data associated with a population of users or a segment of the population of users, the population data corresponding to a set of messages generated when web content associated with a beacon is accessed by client devices of the population of users;
a non-transitory storage device storing an application including instructions; and
one or more processing devices operable to access the application and execute the instructions, the instructions causing the one or more processing devices to:
access the database and the population data;
determine a subset of the population data corresponding to a subset of messages having associated demographic information provided from multiple sources of demographic information, at least one of the multiple sources of demographic information being a cookie exchange;
process the subset of the population data to determine a value associated with each demographic information;
determine a relative reliability of each of the multiple sources of demographic information;
apply the determined relative reliability to the determined values to normalize the demographic information provided from for each of the multiple sources of demographic information for the subset of population data;
aggregate the normalized demographic information for the subset of population data to derive a demographic distribution for the subset of population data; and
apply the derived demographic distribution to the population of users or the segment of the population of users to assign demographic information to the population data; and
store the assigned demographic data with the population data in a database.

22. The system of claim 21 wherein the one or more processing devices are operable to access the application and execute the instructions, the instructions further causing the one or more processing devices to:
generate a report from the assigned demographic information showing the demographic information of the population of users or the segment of the population of users.

23. The system of claim 21 wherein the database stores a report from the assigned demographic information showing the demographic information of the population of users or the segment of the population of users.

24. The system of claim 21 wherein the one or more processing devices are operable to access the application and execute the instructions, the instructions further causing the one or more processing devices to determine a relative reliability of the demographic information from each of the multiple sources of demographic information by comparing the reliability of the demographic information from each of the multiple sources to the reliability of panel centric demographic information.

25. A computer implemented method of assigning demographics to a population of data, the method comprising:
accessing, by one or more processing devices, data associated with a population of users or a segment of the population of users, the population data corresponding to a set of messages generated when web content associated with a beacon is accessed by client devices of the population of users;
determining, by the one or more processing devices, a subset of the population data corresponding to a subset of messages having associated demographic information provided from multiple sources of demographic information, at least one of the multiple sources of demographic information being a cookie exchange;
processing, by the one or more processing devices, the subset of the population data to determine a value associated with each demographic information;
determining, by the one or more processing devices, a relative reliability of each of the multiple sources of demographic information;
applying, by the one or more processing devices, the determined relative reliability to the determined values to normalize the demographic information provided from for each of the multiple sources of demographic information for the subset of population data;
aggregating, by the one or more processing devices, the normalized demographic information for the subset of population data to derive a demographic distribution for the subset of population data;
applying, by the one or more processing devices, the derived demographic distribution to the population of users or the segment of the population of users to assign demographic information to the population data; and
storing the assigned demographic data with the population data in a database.

26. The method of claim 25 further comprising:
generating, by the one or more processing devices, a report from the assigned demographic information showing the demographic information of the population of users or the segment of the population of users.

27. The method of claim 25 further comprising:
storing, in the database, population data having associated demographic information assigned from multiple sources of demographic information including two or more of exchange centric data, profile centric data, and panel centric data.

28. The method of claim 25 wherein determining a relative reliability of the demographic information from each of the multiple sources of demographic information includes comparing the reliability of the demographic information from each of the multiple sources to the reliability of panel centric demographic information.

29. The system of claim 1 wherein the cookie exchange comprises a database system storing unique identifiers and corresponding demographic information associated with the stored unique identifiers.

30. The method of claim 11 wherein the cookie exchange comprises a database system storing unique identifiers and corresponding demographic information associated with the stored unique identifiers.

\* \* \* \* \*